United States Patent [19]

Smith et al.

[11] Patent Number: 4,642,275
[45] Date of Patent: Feb. 10, 1987

[54] MOVING PISTON SEAL ACTIVATOR

[75] Inventors: David F. Smith, Boulder Creek; J. Pierre Wilson, San Jose, both of Calif.

[73] Assignee: Altus Corporation, San Mateo, Calif.

[21] Appl. No.: 827,508

[22] Filed: Feb. 10, 1986

[51] Int. Cl.$^4$ .......................................... H01M 10/44
[52] U.S. Cl. .................................... 429/52; 429/116; 429/118
[58] Field of Search ........................ 429/116, 118, 525

[56] References Cited

U.S. PATENT DOCUMENTS

| | | |
|---|---|---|
| 3,036,140 | 5/1962 | Oestermeyer et al. |
| 3,177,098 | 4/1965 | Amiet et al. |
| 3,284,242 | 11/1966 | Schilke |
| 3,298,868 | 1/1967 | Smith et al. ............... 429/116 X |
| 3,460,993 | 8/1969 | Saunders et al. |
| 3,510,361 | 5/1970 | Saunders |
| 3,712,835 | 1/1973 | Kaye ............................... 429/116 |
| 4,049,888 | 9/1977 | Flender ........................ 429/116 X |

OTHER PUBLICATIONS

Advertising literature of Eagle Picher Industries, Inc. entitled "Introduction to Automatically Activated Silver-Zinc Batteries and Silver-Zinc Primary Batteries Remotely Activated Series."
Article by Honeywell Power Sources Center on its Oxychloride Primary/Reserve Batteries Session entitled "High Rate LI/SOCL2RPV Battery: Design and Performance," pp. 188-191.
Article by Altus Corporation also contained in the Oxychloride Primary/Reserve Battery Session entitled "Lithium-Thionyl Chloride Reserve Batteries," pp. 198-199.
Article by Eagle Picher Industries, Inc. also contained in the Oxychloride Primary/Reserve Battery Session entitled "Lithium-Thionyl Chloride Reserve Batteries," p. 193.
Article by the Naval Surface Weapon Center, White Oak Facility contained in the Lithium Sulphur Dioxide Primary Battery Section entitled "Honeywell Li/So$_2$ and 100 A-Hr Reserve Battery Test Results," pp. 147-148.
Article by Gould Laboratories and the Oxychloride Primary/Reserve Battery Section entitled "Internal Design of High-Rate Reserve Lithium-Thionyl Chloride Batteries," pp. 204-205.
An unauthored diagram entitled "Activated Silver-Zinc System" (2 pages).

Primary Examiner—Donald L. Walton
Assistant Examiner—Stephen J. Kalafut
Attorney, Agent, or Firm—Malcolm B. Wittenberg

[57] ABSTRACT

A reserve battery cell which includes a battery cell housing, an anode and cathode collector, and a reservoir housing which includes a quantity of electrolyte which, when applied to the anode and cathode collector, cause the battery to generate an electric current through an external load. Burst discs are located proximate the extremities of the reservoir housing. The upstream burst disc is capable of rupturing upon the application of sufficient externally applied pressure while the downstream burst disc is capable of rupturing upon the application of sufficient hydraulic pressure exerted thereon by the electrolyte. The piston is located within the reservoir housing which establishes the upstream boundary of the electrolyte and which is capable of traveling down the reservoir housing upon the application of an externally applied pressure and which is characterized as preventing electrolyte from leaking around the piston and any substantial amount of gas from entering the electrolyte through the piston body.

12 Claims, 3 Drawing Figures

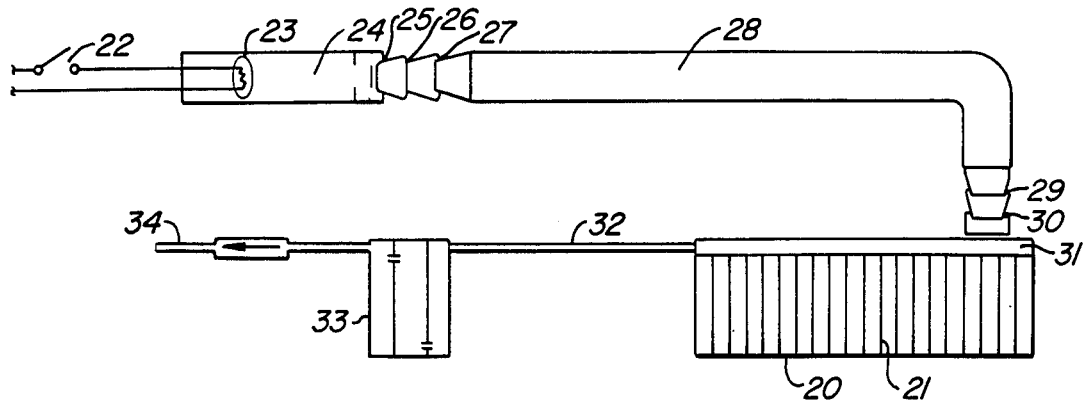
FIG._1.
PRIOR ART
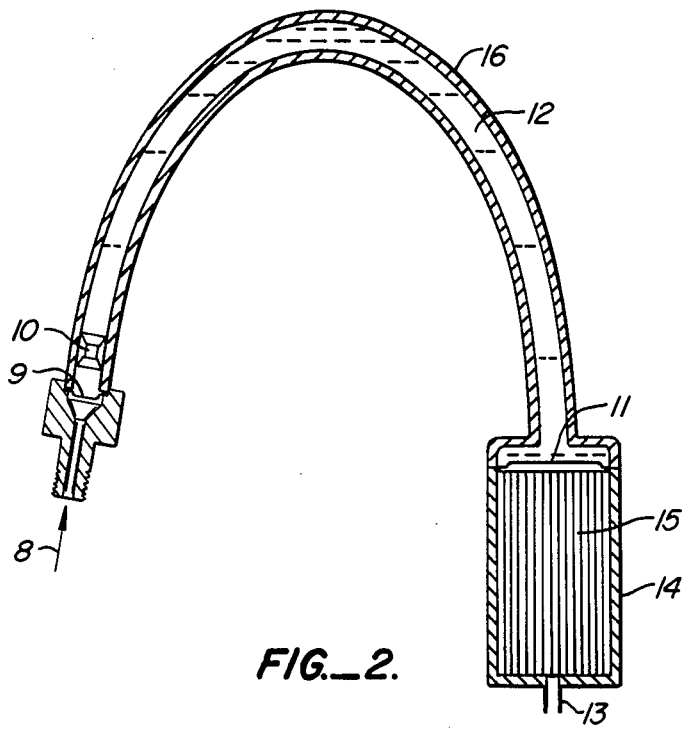
FIG._2.
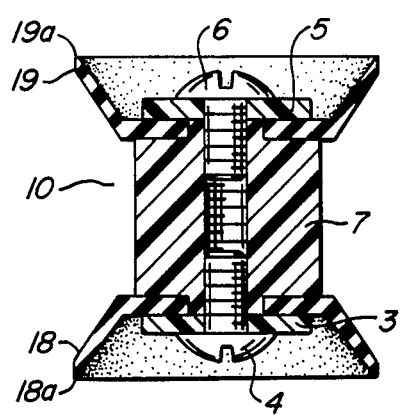
FIG._3.

MOVING PISTON SEAL ACTIVATOR

TECHNICAL FIELD OF INVENTION

The present invention is primarily concerned with means for activating a reserve battery cell while preventing any fluid but the cell electrolyte from contacting the anode and cathode collector.

BACKGROUND OF THE INVENTION

Reserve battery cells are characterized, as the name implies, by the ability to maintain anode and cathode portions of the cell in a dry or unactivated state prior to use. To achieve activation, the electrolyte necessary for battery operation is fed to the individual cells whereupon an electric current may emanate from the cell terminals through an external load.

FIG. 1 depicts a typical prior art approach to the activation of a reserve battery containing a number of cells. Turning to FIG. 1, a stack 10 of individual cells 21, each containing its own anode and cathode, is provided in a dry or unactivated state. As such, the cells are capable of being used years after initial manufacture with little or no loss of potential energy.

When activation is desired, an activation signal is provided by closing switch 22 which sparks electrical match 23 and ignites propellant 24. The force of expansion of the propellant generates gas sufficient to rupture or burst diaphragms 25, 26 and 27 and put pressure upon the electrolyte located in reservoir 28. Being a liquid, the electrolyte is relatively incompressible and thus the force generated by the gas generator propellant causes diaphragms 29 and 30 to rupture, allowing the electrolyte to pass within manifold entry 31 and into individual cells 21.

As cells 21 fill, there is generally an overflow of electrolyte which passes through vent tube 32 into sump 33. Relief valve 34 is provided for the venting of trapped gas downstream of the passing electrolyte.

Although the structure depicted in FIG. 1 is more than adequate to activate a reserve cell, certain inherent difficulties are experienced by this typical prior art approach to the activation problem. The most common problem observed is that after activation, a pool of electrolyte is caused to appear in each cell and throughout the manifold which provides a current leakage path between cells. In other words, there is simply no liquid seal which is formed after the activation process is carried out. In addition, the interconnecting electrolyte paths can result in parasitic capacity losses after activation but before use of the battery as well as an unwanted gas pressure buildup and, in extreme cases, catastrophic battery short-circuiting via metal deposition within the manifold housing. The only requisite for current leakage is a continuous path of conductive electrolyte between cells. This provides the necessary potential difference to support electrochemical reactions which result in metal deposition and electrolysis within the affected battery assembly. Substantial elimination of this apparent problem is fully disclosed in applicant's co-pending U.S. application Ser. No. 762,332 filed on Aug. 5, 1985.

Yet another disadvantage inherent in the use of prior art designs is the inability to prevent fluids other than the electrolyte from entering the cell housing and contacting the anode and cathode collector. Quite frequently, gases which are generated in the expansion of the propellant speedily tunnel their way through the electrolyte and enter the battery housing prior to a complete filling of the housing by the electrolyte itself. This diminishes electrolyte-anode/cathode current collector contact and thus reduces the performance characteristics of the cell.

It is thus an object of the present invention to provide a reserve battery cell which can be activated at will without experiencing any of the disadvantages inherent in the known prior art designs.

It is yet a further object of the present invention to provide a reserve battery cell which is capable of being activated and which inherently insures that electrolyte and only electrolyte passes within the cell housing.

These and further objects of the present invention will be more readily appreciated when considering the following disclosure and appended figures wherein FIG. 2 represents a cutaway plan view of a typical embodiment of the present invention.

FIG. 3 depicts a detailed cross-sectional view of the piston of the present invention.

SUMMARY OF THE INVENTION

The present invention deals with a reserve battery cell which comprises a battery cell housing, an anode and cathode collector located within the housing, and which is activated by the introduction of a quantity of electrolyte causing the battery to generate an electric current. The device of the present invention differs from prior art devices by including a reservoir housing for storing the electrolyte prior to its application to the anode and cathode which, in turn, includes upstream and downstream burst discs located proximate the extremities of the reservoir housing and piston means separating the reservoir of electrolyte from the upstream burst disc.

The upstream burst disc is taught to be capable of rupturing upon the application of sufficient externally applied pressure while the downstream burst disc is capable of rupturing upon the application of sufficient hydraulic pressure exerted thereon by the electrolyte.

The piston means located within the reservoir housing establishes the upstream boundary of the electrolyte. It is capable of traveling down the reservoir housing upon the application of externally applied pressure and is further characterized as substantially preventing electrolyte from leaking around the piston to any substantial degree, while preventing gas from entering the electrolyte either through the piston body or between the piston and the inner walls of the reservoir housing.

DETAILED DESCRIPTION OF THE INVENTION

Although the means for activating reserve cells as presented herein can be used with virtually any electrochemical battery using liquid electrolyte, the present invention is particularly useful when utilizing a highly reactive "consumable" anode material such as an alkaline metal. Typical electrochemical batteries include an outer casing and electrically insulated terminals which together define a sealed interior chamber. Batteries also typically include an arrangement for electrically interconnecting components located within the chamber for producing a voltage drop of a characteristic value across the terminals. A common arrangement of this type is made up of an anode, an electrically insulated and spaced-part cathode, and an electrolyte solution which fills the chamber and surrounds the various other components making up the arrangement.

To meet the demand for high performance batteries, substantial work has been done with cell chemistry using an alkaline metal anode, particularly lithium. The cathode and electrolyte material consisting of a solvent and a solute vary. Indeed, the literature is replete with examples of alkaline metal anode cells with different cathodes and electrolytes. The electrical characteristics of these cells, such as energy per unit volume, called energy density, cell voltage, and internal impedance, vary greatly.

Among all known combinations of lithium anode with different cathodes and electrolytes, those believed to have among the highest energy density and current delivery capability use certain inorganic liquids as the active cathode depolarizer. This type of cell chemistry is commonly referred to as a liquid cathode.

The use of a liquid as an active cathode depolarizer is a conventional expedient in current cell technology. Until recently, it was generally believed that the active cathode depolarizer could never directly contact the anode. However, it is now known that certain active cathode materials do not react chemically to any appreciable extent with an active anode material at the interface between the metal and the cathode material, thereby allowing the cathode material to contact the anode directly.

Typical of such cells is the employment of an anode such as lithium metal or alloys of lithium in an electrolyte solution which is an ionically conductive solute dissolved in a solvent that is also the active cathode depolarizer. This solute may be a simple or double salt which will produce an ionically conductive solution when dissolved in the solvent. Preferred solutes are complexes of inorganic or organic Lewis acids and an inorganic ionizable salt. The requirements for utility are that the salt, whether simple or complex, be compatible with the solvent being employed, yielding a solution which is ionically conductive. According to the Lewis or electronic concept of acids and bases, many substances which contain no active hydrogen can act as acids or acceptors or electron doublets. In U.S. Pat. No. 3,542,602, it is suggested that the complex or double salt formed between a Lewis acid and an ionizable salt yields an entity which is more stable than either of the components alone.

Typical Lewis acids suitable for use in electrochemical cells such as those disclosed herein include aluminum chloride, antimony, pentachloride, zirconium tetrachloride, phosphorus pentachloride, boron fluoride, boron chloride, and boron bromide.

Ionizable salts useful in combination with the Lewis acids include lithium chloride, lithium fluoride, lithium bromide, lithium sulfide, sodium fluoride, sodium chloride, sodium bromide, potassium fluoride, potassium chloride, and potassium bromide.

The double salts formed by a Lewis acid and an inorganic ionizable salt may be used as such, or the individual components may be added to the solvent separately to form the salt. One such double salt, for example, is that formed by the combination of aluminum chloride and lithium chloride to yield lithium aluminum tetrachloride. In addition to an anode, active cathode depolarizer (liquid cathode) and an ionically conductive electrolyte, the cells require a current collector or cathode collector comprised of, in many instances, compressed carbon either alone or with other additives including binders.

In the typical electrochemical cell as described above, thionyl chloride is employed as a preferred solvent-depolarizer. In such a system, the discharge reaction is as follows:

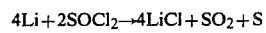

$$4Li + 2SOCl_2 \rightarrow 4LiCl + SO_2 + S$$

Typically contained within the liquid depolarizer and as an important constituent of the electrolyte is a solute such as $LiAlCl_4$ contained in the range of approximately 0.3 to 3.0 M. These various contituents make up what has been referred to as the electrolyte which, as previously noted, is kept separate and apart from the anode and cathode collector which, as a result, are maintained in a dry state until the reserve cell is "activated."

Turning to FIG. 2, an overall portrayal of the present invention is provided. In operation, a source of pressure is schematically shown as arrow 8 which can emanate from any well-known source such as that shown in FIG. 1 whereby an activation signal ignites a propellant and generates a quantity of gas. This in turn exerts a pressure which is sufficient to rupture burst disc 9. As a consequence, pressure is applied to piston 10 causing the piston to push against electrolyte 12 by traveling along the inner wall of reservoir housing 16.

The movement of piston 10 toward battery cell housing 14 results in the application of an hydraulic pressure upon downstream burst disc 11. When this hydraulic pressure is of sufficient magnitude, burst disc 11 will rupture allowing electrolyte 12 to pass within cell housing 14 and contact individual cell elements 15 which activates the cell into the generation of an electric current. The burst disks used herein are designed to rupture under a nominal pressure of 50 to 100 psi. The disks are ideally composed of 300 series stainless steel welded to headers within the electrolyte housing. As an optional expedient, trapped gases located within cell housing 14 downstream of the electrolyte flow can be substantially vented through vent port 13 as depicted in FIG. 2.

An incidental benefit derived through the practice of the present invention is the maintenance of a pressure of several atmospheres upon the electrolyte which can be of great value when dealing with high rate batteries. If pressure is maintained upon the electrolyte and if the electrolyte reservoir is configured to house excess liquid, the cell can be operated with a constant ready supply of electrolyte during battery operation. The present invention, employs a piston. This maintains a constant pressure upon the reservoir and causes the electrolyte to be constantly fed to the cells during electrolyte consumption—which is incidental to battery discharge. Prior art designs are incapable of performing such a function.

It cannot be overly emphasized that through the practice of the present invention, gases and other contaminants entering the reservoir housing, such as through activation of the invention by externally applied pressure in the direction of arrow 8, is substantially prevented from tunneling through the electrolyte and entering cell housing 14 by means of piston body 10 which is configured in a manner as depicted in FIG. 3.

The configuration of the piston of FIG. 3 is instrumental in carrying out the present invention. As noted, piston means 10 is composed of two cup-shaped ends 18 and 19 which are ideally composed of a flexible, resilient material such as flourinated ethylene propylene copolymer (FEP). In operation, when externally applied pressure causes upstream burst disc 9 to rupture, pressure is exerted against cup-shaped element 18 which, in turn, is caused to slightly deform by flattening. This causes circumferential lip 18A to press against the inner wall of reservoir housing 16 which, in turn, causes a sealing engagement between the elements.

At substantially the same instant that cup-shaped member 18 is deforming, piston 10 is caused to press against electrolyte 12. Because the liquid electrolyte is somewhat noncompressible, backward pressure is exerted upon cup-shaped member 19 prior to rupture of downstream burst disc 11. This causes deformation of cup-shaped member 19 and substantial engagement between lip 19A and the inner wall of reservoir 16. As such, when working in conjunction with one another, cup-shaped members 18 and 19 simultaneously deform to substantially seal the externally applied activating gases from entering electrolyte reservoir 12.

The flexible and somewhat deformable cup-shaped members 18 and 19 are held to relatively rigid piston body 7 which, in turn, is comprised of, for example stainless steel. As noted in FIG. 3, attachment, by means of screws 4 and 6 and washers 3 and 5, respectively, attach the bases of each cup-shaped member so that the side walls of each cup-shaped member extend outwardly and away from the piston body.

EXAMPLE

A 149 cell bipolar pile battery with an internal unactivated void volume of approximately one (1) liter was activated by applying pressure from a pyrotechnic gas generator to a steel coil reservoir containing approximately 1.25 liters of electrolyte. The reservoir configuration was that of a ten (10) inch diameter coil, one inch diameter tube with a length of approx. 120 inches. The reservoir contained the electrolyte, an expansion bubble volume, the piston assembly of FIG. 3, and two (2) sets of steel burst disks for inlet and outlet. Two (2) disks in series were used to provide redundancy. The gas generator pressure, as measured by a pressure transducer upstream of the piston, reached approx. 300 lb/in$^2$ within 0.5 seconds, then decreased to approx. 150 lb/in$^2$ at 2.0 seconds. The residual pressure for the battery discharge was 150 lb/in$^2$. The battery activated within 1.5 seconds with the electrical loads applied.

While the present invention has been illustrated and described above, the invention is not to be limited to any particular construction shown. Other modifications of the present invention will occur to those skilled in the art to which the invention relates and it is the intention to cover hereby all such modifications that come within the scope of the appended claims.

We claim:
1. A reserve battery cell comprising
   a. a battery cell housing,
   b. an anode and a cathode collector located within said housing,
   c. a quantity of electrolyte which, when applied to said anode and cathode collector, can cause the battery to generate an electric current through an external load,
   d. a reservoir housing for storing said electrolyte prior to its application to said anode and cathode,
   e. upstream and downstream burst discs located proximate the extremities of said reservoir housing, said upstream burst disc being capable of rupturing upon the application of efficient externally applied pressure and said downstream burst disc being capable of rupturing upon the application of sufficient hydraulic pressure exerted thereon by said electrolyte, and
   f. piston means located within said reservoir housing in establishing the upstream boundary of said electrolyte and which is further capable of traveling down said reservoir housing upon the application of said externally applied pressure and which is further characterized as substantially preventing electrolyte from leaking around the piston means and any substantial amount of gas from entering the electrolyte through the piston body.

2. The reserve battery cell of claim 1 wherein said externally applied pressure is generated upon said upstream burst disc and piston in the form of a gas.

3. The reserve battery of claim 1 wherein the electrolyte comprises the combination of thionyl chloride and lithium aluminum chloride.

4. The reserve battery cell of claim 1 wherein said anode comprises lithium.

5. The reserve battery cell of claim 1 wherein said piston means is a member comprising two cup-shaped ends composed of a flexible, resilient material, each cup-shaped end being attached to an axially extending, relatively rigid piston body, said attachment being at a base of each cup-shaped end so that side walls of each cup-shaped end extend outwardly and away from the piston body and which is further characterized such that each cup-shaped end is substantially circular and cross-sectioned with its circumferential lip substantially co-extensive with the inner wall of the reservoir housing.

6. The reserve battery cell of claim 5 wherein said piston means is further characterized such that upon the application of said externally applied pressure, the circumferential lip of each cup-shaped end contacts the inner wall of said reservoir in substantially sealing engagement.

7. A method of activating a reserve battery cell which, prior to activation, comprises
   a. a battery cell housing,
   b. an anode and a cathode collector located within said housing,
   c. a quantity of electrolyte which, when applied to said anode and cathode collector, can cause the battery to generate an electric current through an external load,
   d. a reservoir housing for storing said electrolyte prior to its application to said anode and cathode,
   e. upstream and downstream burst discs located proximate the extremities of said reservoir housing, said upstream burst disc being capable of rupturing upon the application of efficient externally applied pressure and said downstream burst disc being capable of rupturing upon the application of sufficient hydraulic pressure exerted thereon by said electrolyte, and
   f. piston means located within said reservoir housing in establishing the upstream boundary of said electrolyte and which is further capable of traveling down said reservoir housing upon the application of said externally applied pressure which is further characterized as substantially preventing electrolyte from leaking around the piston means and any substantial amount of gas from entering the electrolyte through the piston body, wherein said method comprises applying externally applied pressure to said upstream burst disc causing pressure to be exerted upon said piston means which in turn moves the piston toward the electrolyte which exerts hydraulic pressure upon said downstream burst disc in an amount sufficient to burst the same allowing electrolyte to pass into the battery cell housing.

8. The method of claim 7 wherein said externally applied pressure is exerted upon said upstream burst disc in the form of a gas.

9. The method of claim 7 wherein the electrolyte comprises the combination of thionyl chloride and lithium aluminum chloride.

10. The method of claim 7 wherein said anode comprises lithium.

11. The method of claim 7 wherein said piston means is a member comprising two cup-shaped ends composed of a flexible, resilient material, each cup-shaped end being attached to an axially extending relatively rigid piston body, said attachment being at a base of each cup-shaped end so that the side walls of each cup-shaped end extend outwardly and away from the piston body and which is further characterized such that each cup-shaped end is substantially circular and cross-sectioned with its circumferential lip substantially co-extensive with the inner walls of the reservoir housing.

12. The method of claim 11 wherein said piston means is further characterized such that upon the application of said externally applied pressure, the circumferential lip of each cup-shaped end contacts the inner wall of said reservoir in substantially sealing engagement.

* * * * *